US007239930B2

(12) United States Patent
Burda et al.

(10) Patent No.: US 7,239,930 B2
(45) Date of Patent: Jul. 3, 2007

(54) METHOD, SYSTEM, AND COMPUTER PROGRAM PRODUCT FOR IMPROVED FLOW OF DEVELOPMENT LOTS IN A MANUFACTURING FACILITY

(75) Inventors: Richard G. Burda, Pleasant Valley, NY (US); Alfred Degbotse, Colchester, VT (US); Brian T. Denton, Winooski, VT (US); Kenneth J. Fordyce, Hurley, NY (US); Robert J. Milne, Jericho, VT (US); Elizabeth L. Williamson, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 10/908,714

(22) Filed: May 24, 2005

(65) Prior Publication Data

US 2006/0271220 A1 Nov. 30, 2006

(51) Int. Cl.
*G06F 19/00* (2006.01)
(52) U.S. Cl. .................. 700/100; 700/108; 250/306
(58) Field of Classification Search ............... 700/100, 700/99, 102, 121, 101, 108, 112, 169; 705/8; 436/164; 250/306
See application file for complete search history.

(56) References Cited

U.S. PATENT DOCUMENTS

| 4,866,628 | A | * | 9/1989 | Natarajan | 700/102 |
|---|---|---|---|---|---|
| 5,325,304 | A | | 6/1994 | Aoki | |
| 5,442,561 | A | * | 8/1995 | Yoshizawa et al. | 700/100 |
| 5,826,236 | A | | 10/1998 | Narimatsu et al. | |
| 6,360,132 | B2 | | 3/2002 | Lin et al. | |
| 6,434,443 | B1 | | 8/2002 | Lin | |
| 6,687,563 | B1 | | 2/2004 | Wang et al. | |
| 6,714,829 | B1 | * | 3/2004 | Wong | 700/101 |
| 6,845,280 | B1 | | 1/2005 | Rives et al. | |
| 2006/0020358 | A1 | * | 1/2006 | Chen | 700/96 |
| 2006/0052897 | A1 | * | 3/2006 | Liao | 700/108 |
| 2006/0271222 | A1 | * | 11/2006 | Lilly et al. | 700/100 |

FOREIGN PATENT DOCUMENTS

| JP | 56019635 A | 2/1981 |
|---|---|---|
| JP | 5108116 A | 4/1993 |

* cited by examiner

*Primary Examiner*—Kidest Bahta
(74) *Attorney, Agent, or Firm*—Richard M. Kotulak; Hoffman, Warnick & D'Alessandro LLC (57) ABSTRACT

The present invention provides a method, system, and computer program product for improved flow of development lots in a manufacturing facility. A method in accordance to one embodiment of the present invention comprises: establishing at least one target for processing of a set of development lots in the manufacturing facility; monitoring a progress of the set of development lots in the manufacturing facility; comparing the progress of the set of development lots against the at least one target; establishing at least one suggested action for the set of development lots if the progress of the set of development lots deviates from the at least one target; and deciding which development lots in the set of development lots to assign to at least one tool in the manufacturing facility, wherein the at least one suggested action is incorporated into the assignment decision.

20 Claims, 5 Drawing Sheets

METHOD, SYSTEM, AND COMPUTER PROGRAM PRODUCT FOR IMPROVED FLOW OF DEVELOPMENT LOTS IN A MANUFACTURING FACILITY

FIELD OF THE INVENTION

The present invention relates to the field of manufacturing facility control such as used in a semiconductor manufacturing facility; more specifically, the present invention relates to a method, system, and computer program product for improved flow of development lots in a manufacturing facility.

RELATED ART

One of the critical questions that must be answered in a manufacturing facility (e.g., a semiconductor manufacturing facility) is: "what lot to run next on a tool when the tool becomes free." This is referred to as a "What Next" dispatch decision and is currently determined by what is referred to generically as a What-Next-Module (WNM). This decision is one of a hierarchical set of matching (assets with demand) decisions in which an asset (e.g., a manufacturing tool) can execute one of several manufacturing processes, and a demand is a lot (e.g., a wafer lot) requiring one of the manufacturing processes the tool can execute. The WNM must ensure that various system constraints are not violated (e.g., capacity constraints, lot-to-tool compatibility, batch size limits, etc.). Other constraints can be established by business guidelines (e.g., lot type to tool dedication strategies, tool specific inhibits, phase in tools, etc.). Within these constraints, the WNM module attempts to account for a series of dispatching metrics including: priorities, due dates, lot dependent setups, maximizing batch size, work in process (WIP) balancing, and synchronization across the manufacturing facility.

Dispatching ideally identifies the next lot to run on a tool which optimizes the position of the total supply chain based on constraints and metrics such as those described above. Current dispatching-based systems typically rely on real-time list based scheduling in which lots immediately available for dispatch are sorted based on identified criteria, and lots are released based on this priority ordering. There is substantial prior art addressing this list-based dispatching. One known method is based on the concept of critical ratio, which is defined as follows:

critical ratio=(lot due date−current date)/(standard days processing).

A substantive new feature emerging in state of the art semiconductor wafer fabrication facilities is the use of the same manufacturing equipment and floor control system to produce development and production lots. Development lots are processed primarily for the purpose of gaining information useful in the development (i.e., creation or adjustment) of manufacturing processes and products, while production lots typically result in product which may be used further downstream in the supply chain. Historically, these two types of lots were handled by separate facilities, but often they now cohabitate the same environment, the dispatch decisions (assignment of a lot to a tool) are made by the same application, and the lots compete for manufacturing capacity. However, the nature of development lots in terms of lot size, due dates, demand priority, variability in business goals, and frequency of being placed on engineering hold remain substantively different than those of production lots. As a result, trade-offs need to be made in assignment decisions that previously were never a concern to dispatch applications that assign lots to tools.

SUMMARY OF THE INVENTION

The present invention generally provides a method, system, and computer program product for improved flow of development lots in a manufacturing facility. In particular, the stream of assignment decisions for development lots to tools is synchronized to optimize the manufacturing facilities' performance with respect to the business goals of development lots within the constraint of production requirements. A Development Lot Advocate is provided to: (a) continuously monitor the flow of each development lot with respect to business targets and emerging conditions (local and global) on the manufacturing floor; (b) dialogue directly with the various local control agents that control the assignment of lots to tools for specific tool sets to assess the likely projected progress of a development lot and gauge the impact of altering a development lot priority, candidate tool list, or tool preferences on development lots and production lots; and (c) negotiate with a judging system when it requires a rebalancing of relative priorities between development lot groups or with production lots, a business target is not achievable, or a change in a business target is required. The Development Lot Advocate accomplishes this in an iterative collaborative process that influences, but does not dictate, the large number (e.g., tens of thousands) of local control agent decisions to assign lots to tools typically made each day in a manufacturing facility.

A first aspect of the present invention is directed to a method for controlling the flow of production lots and development lots in a manufacturing facility, comprising: establishing at least one target for processing of a set of development lots in the manufacturing facility; monitoring a progress of the set of development lots in the manufacturing facility; comparing the progress of the set of development lots against the at least one target; establishing at least one suggested action for the set of development lots if the progress of the set of development lots deviates from the at least one target; and deciding which development lots in the set of development lots to assign to at least one tool in the manufacturing facility, wherein the at least one suggested action is incorporated into the assignment decision.

A second aspect of the present invention is directed to a system for controlling the flow of production lots and development lots in a manufacturing facility, comprising: means for establishing at least one target for processing of a set of development lots in the manufacturing facility; means for monitoring a progress of the set of development lots in the manufacturing facility; means for comparing the progress of the set of development lots against the at least one target; means for establishing at least one suggested action for the set of development lots if the progress of the set of development lots deviates from the at least one target; and means for deciding which development lots in the set of development lots to assign to at least one tool in the manufacturing facility, wherein the at least one suggested action is incorporated into the assignment decision.

A third aspect of the present invention is directed to program product stored on a computer readable medium for controlling the flow of production lots and development lots in a manufacturing facility, the computer readable medium comprising program code for performing the following steps: establishing at least one target for processing of a set of development lots in the manufacturing facility; monitoring a progress of the set of development lots in the manufacturing facility; comparing the progress of the set of development lots against the at least one target; establishing at least one suggested action for the set of development lots if the progress of the set of development lots deviates from the at least one target; and deciding which development lots in the set of development lots to assign to at least one tool in the manufacturing facility, wherein the at least one suggested action is incorporated into the assignment decision.

DETAILED DESCRIPTION OF THE INVENTION

Figure 1:
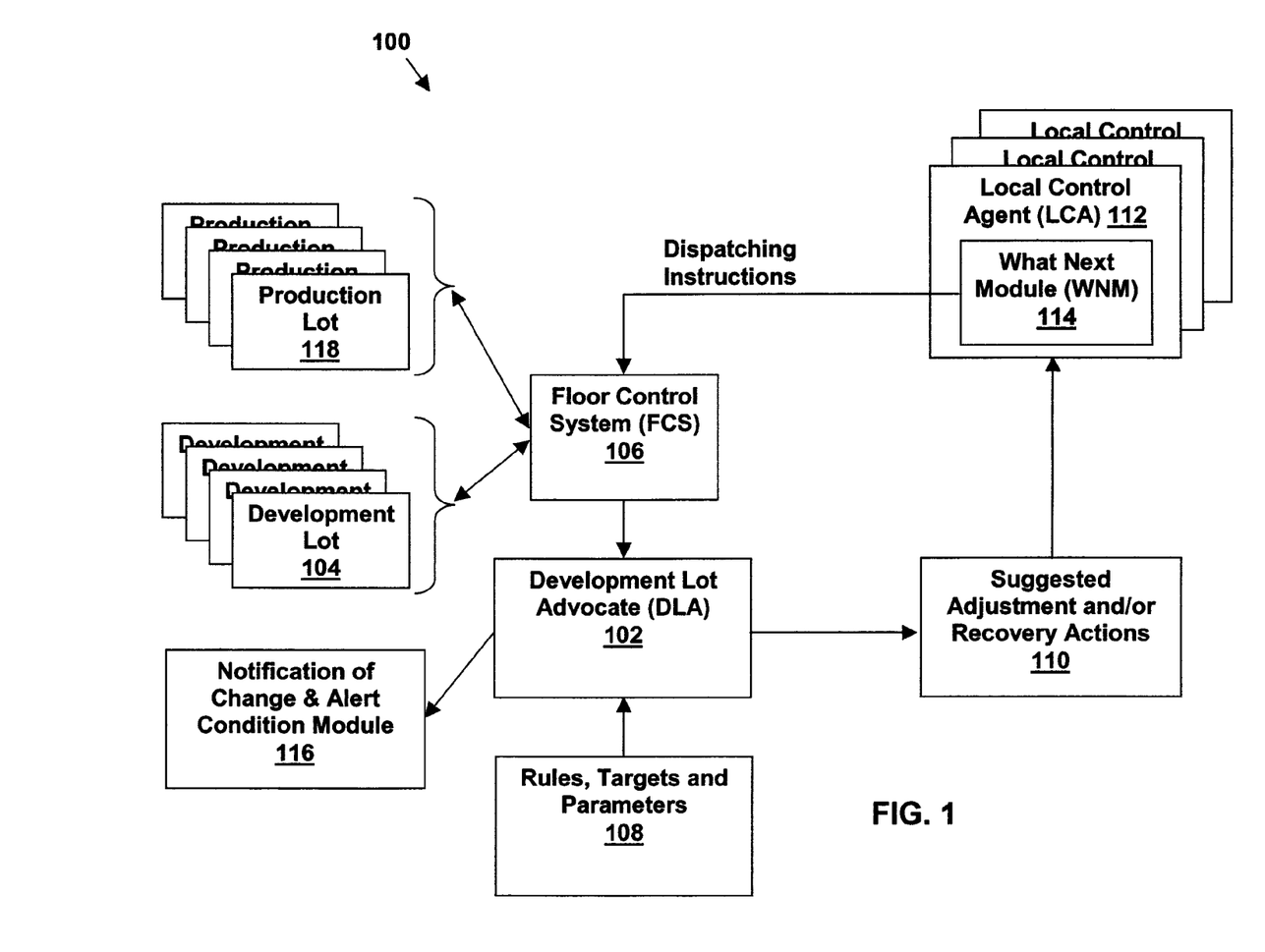
FIG. 1 depicts an illustrative system for providing an improved flow of development lots in a manufacturing facility in accordance with an embodiment of the present invention.

An illustrative system 100 for providing an improved flow of development lots in a manufacturing facility in accordance with an embodiment of the present invention is illustrated in FIG. 1. System 100 includes a Development Lot Advocate (DLA) 102 for continuously monitoring the flow of development lots 104 in a manufacturing facility, based on information on the progress of the development lots 104 provided by a Manufacturing Execution System (MES) Floor Control System (FCS) 106. The DLA 102 compares the progress of the development lots 104 with business targets according to established rules, targets and parameters 108. Based on the comparison, those development lots 104 that are behind or ahead of target are identified by the DLA 102. In response, suggested adjustment and/or recovery actions 110 for the identified developments lots 104 are determined by the DLA 102 and sent to the appropriate local control agents (LCAs) 112. The LCAs 112 incorporate the suggested adjustment and/or recovery actions 110 into their What Next Module (WNM) 114 decision activity, which provides dispatching instructions to the FCS 106 regarding which development or production lot to run next. If, during the adjustment and recovery phase, it is determined that a change in business goals may be required or a development lot 104 target will not be achieved, this information is posted in a notification of change and alert module 116.

Figure 2:
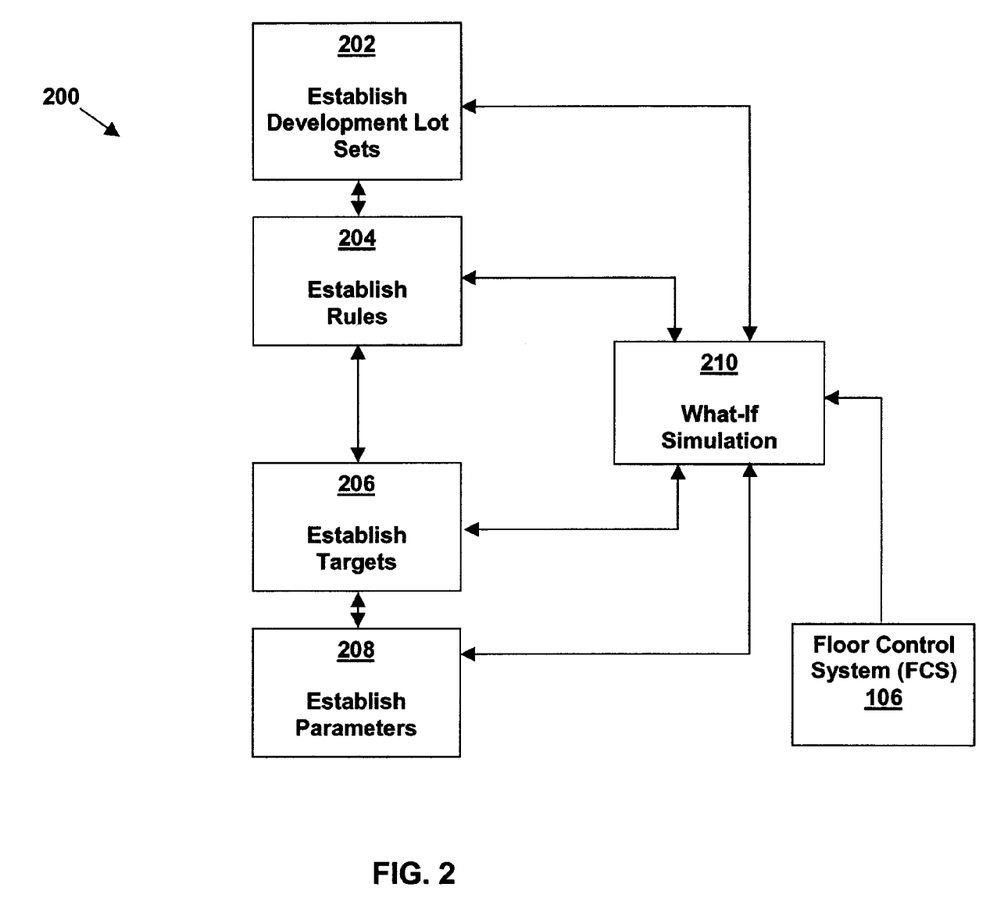
FIG. 2 depicts a flow diagram of the establishment and modification of development lot sets, and the rules, targets, and parameters that control the relative prioritization of development lots in accordance with an embodiment of the present invention.

FIG. 2 illustrates a flow diagram 200 of the establishment and modification of development lot 104 sets and the rules, targets, and parameters 108 that control the relative prioritization of development lots 104 in accordance with an embodiment of the present invention. The flow diagram 200 will be described with reference to the components of the system 100 illustrated in FIG. 1.

In block 202, sets of development lots 104, controlled and monitored according to a given set of rules, targets, and parameter 108, are established. A set of development lots 104 may be as large as all (i.e., N) development lots 104, as small as a single development lot 104, or of intermediate size X (i.e., 1<X<N) (e.g., the set of all development lots 104 used in a particular technology). When a particular development lot 104 exists in a plurality of sets, the rules, targets, and parameters 108 corresponding to the set containing the fewest number of development lots 104 will apply.

In blocks 204, 206, and 208 of FIG. 2, the rules, targets, and parameters 108 involved in the monitoring and prioritization of the development lots 104 in a set are established and modified. A sample instantiation of a rule and target may comprise, for example: execute at least 400 tool loads of the development lots in a set during each preceding 24 hour time window; if during the previous 24 hours fewer than 400 tool loads have been accomplished, then increase the priority of development lots in the set so that they take pre-emptive priority over all non-development lots at a specified set of tools. (Other priority variation examples may include, for instance, adjusting the nominal priority of the development lots in the set by dividing the nominal priority by, or subtracting from the nominal priority, a pre-specified number.) Another instantiation example may comprise, for instance: set interim destination targets for individual development lots based on expected progress and business needs and adjust for changes in the development lot status (e.g., such as being placed on hold or delayed at a pinch point tool area as a result of tool unavailability). Modifications to the development lots 104 in a set and the rules, targets, and parameters 108 are made in blocks 202, 204, 206, and 208 as a result of changing business priorities. A what-if simulation model (e.g., deterministic or stochastic) of the flow of development and/or production lots in the manufacturing facility (or subsets thereof) may be executed in block 210 to determine the likely impact of the rules, targets, and parameters 108 so that the latter may be updated/modified appropriately. The what-if simulation model in block 210 can be provided with data from the FCS 106 either periodically or in real time so that the simulation output will have reasonable accuracy.

Figure 3:
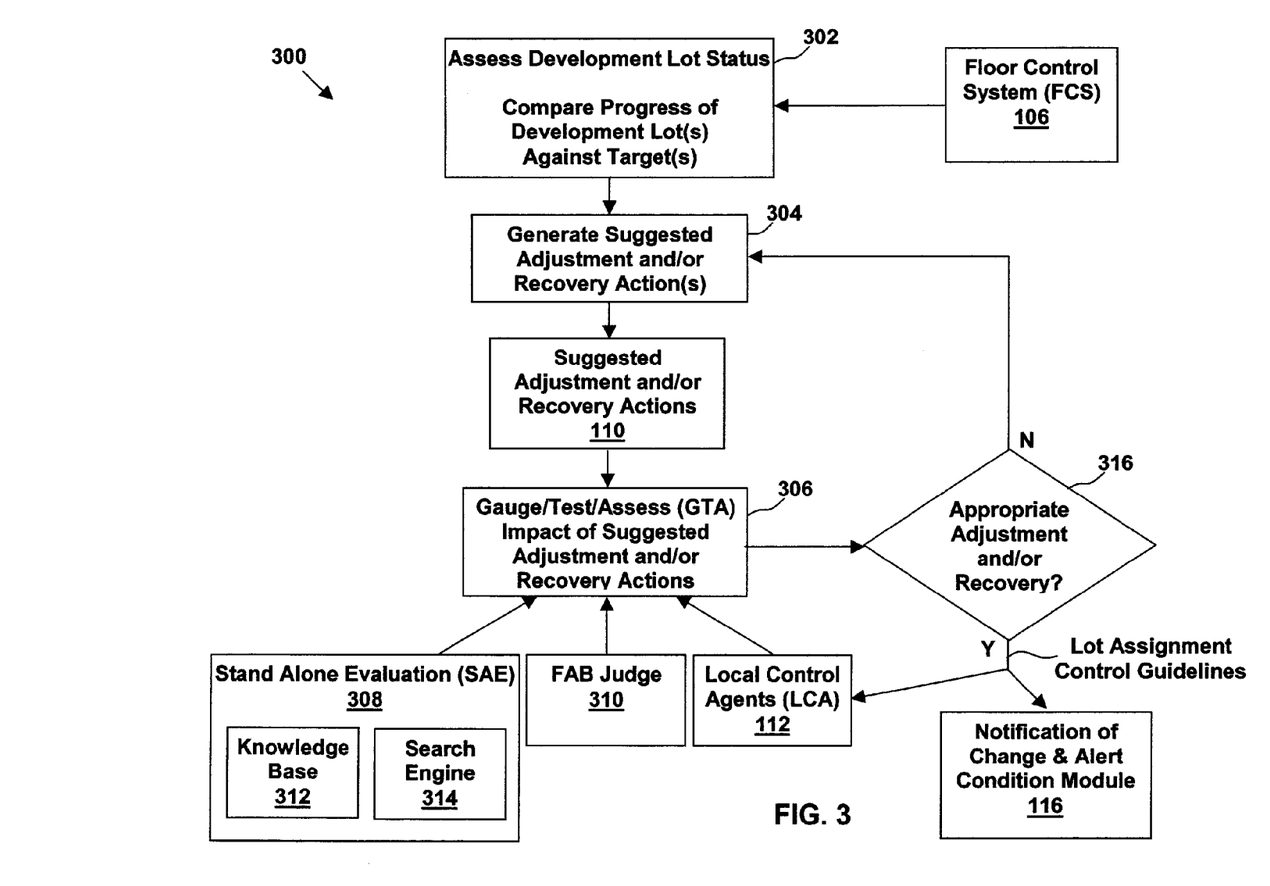
FIG. 3 depicts a flow diagram of the operation of a Development Lot Advocate in accordance with an embodiment of the present invention.

FIG. 3 depicts a flow diagram 300 detailing the operation of the DLA 102 in accordance with an embodiment of the present invention. The flow diagram 300 will be described with reference to the components of the system 100 illustrated in FIG. 1. In block 302, the status of development lot(s) 104 is assessed. In particular, the progress of development lot(s) 104 is compared against business targets based on status information provided by the FCS 106, such as the number of development lot tool loads, location of development lots, number of moves by individual or groups of development lots, tool status history, etc. Block 304 is invoked if a development lot 104 or set of development lots 104 is determined to be behind or ahead of schedule. Block 304 generates a set (i.e., one or more) of suggested adjustment and/or recovery actions 110. The suggested adjustment and/or recovery actions 110 can include, for example, altering a priority of a development lot 104, changing tool preference or allocation, altering preferred batch size, changing a target, altering a preference relationship with a group of production lots 118 (FIG. 1) or other development lots 104, modification of global priorities, altering of local rules, etc. The suggested adjustment and/or recovery actions 110 are sent to a gauge, test, and assess (GTA) module 306, which assesses the impact of the suggested adjustment and/or recovery actions 110 and makes minor modifications to the suggested adjustment and/or recovery actions 110, if necessary (block 316). The GTA module 306 dialogues with its own stand alone evaluation (SAE) module 308, a FAB judge 310, and the LCAs 112 to assess the impact of the suggested adjustment and/or recovery actions 110.

The SAE module 308 has two components for evaluating suggested adjustment and/or recovery actions. Specifically, the SAE module 308 includes a knowledge base structure 312 of prior uses of suggested adjustment and/or recovery actions and a heuristic search engine 314 to evaluate the knowledge base 312 based on the current situation. The heuristic search engine 314 comprises a simulation model that is configured to project forward the state of the line if a suggested adjustment and/or recovery action is taken.

The FAB judge 310 is the keeper of the overall manufacturing facility priorities and targets. The FAB judge 310 is consulted when the DLA 102 believes any of the following items is required: a rebalancing of relative priorities between development lots 104 and production lots 118; a business target is not achievable; or a change in a business target is required.

The LCAs 112 are responsible for the detailed minute by minute control over tool sets. The LCAs 112 have responsibility for the assignment of a development or production lot to a tool, what tasks each tool is available to process, and the relative preference of a specific tool for a task, preventive maintenance, qualification, etc. Additionally, each LCA 112 has the ability to project forward in time a detailed and precise estimate of the lots completed by the tool set it controls under a given set of conditions. Each LCA 112 is consulted to obtain detailed estimates of when a lot is likely to finish at the tool set it controls and the likely impact of a change in dispatch guidelines (such as lot priority, preferred batch size, tool assignment, change in tool dedication, time between preventive maintenances, etc) on the near term detailed production output of the tool set.

The GTA 306 iterates between each of the three entities it consults (i.e., SAE module 308, FAB judge 310, and LCAs 112) and its own intelligence on an as needed basis until it completes its determination of whether a suggested adjustment and/or recovery action 110 will result in an appropriate adjustment/recovery (block 316). If the answer is no, then control returns to block 304 and a new suggested adjustment and/or recovery action 210 is generated. The results of the previous assessment are sent back to block 304. If the answer is yes, then, as appropriate, control guidelines on how to assign development or production lots to tools are sent to the LCAs 112 and their WNMs 114 and updates are posted to the notification of change and alert module 116.

Figure 4:
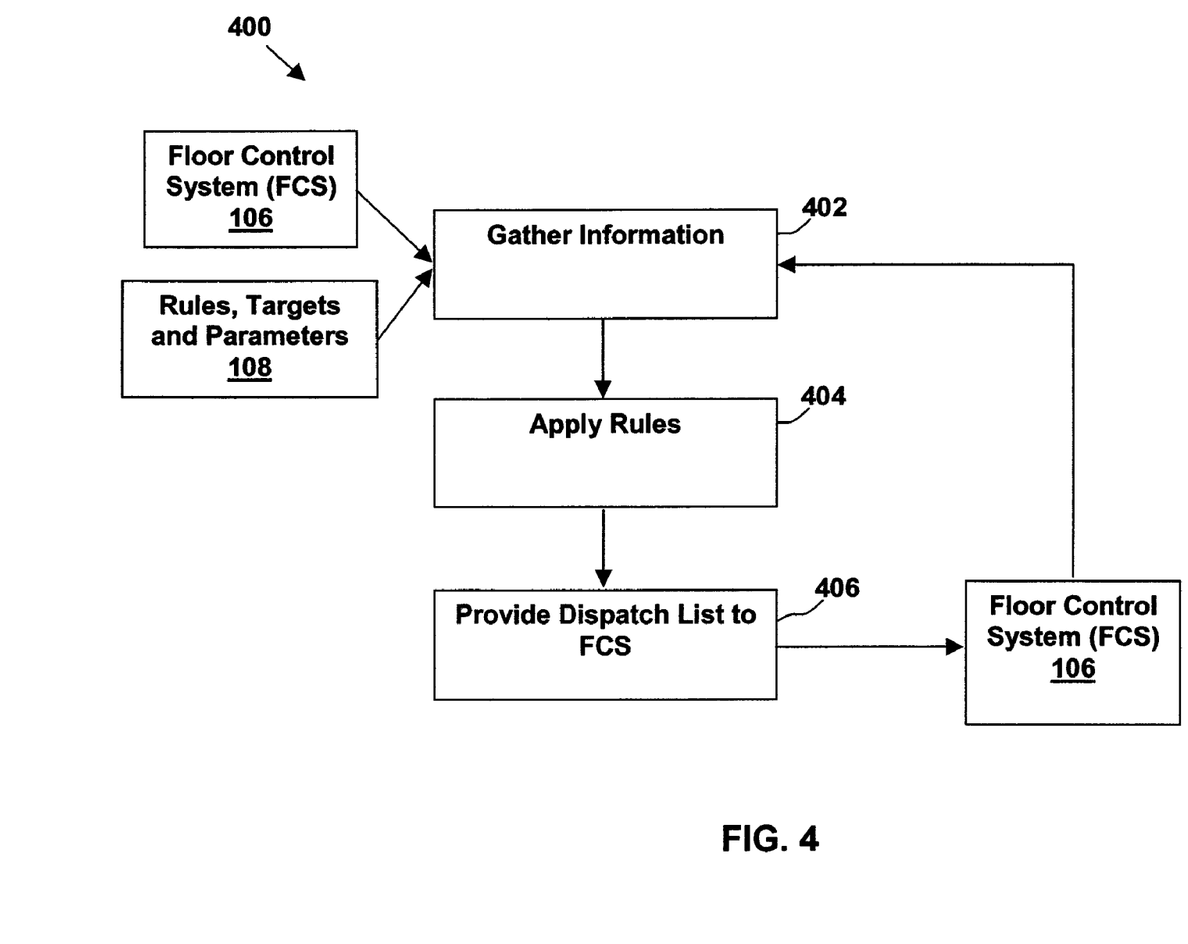
FIG. 4 depicts a flow diagram of the operation of a What's Next Module in accordance with an embodiment of the present invention.

FIG. 4 depicts a flow diagram 400 of the operation of a WNM 114 in accordance with an embodiment of the present invention. In block 402, relevant information from the FCS 106, including development lot priorities and production lot priorities, and the business rules, targets, and parameters 108 are gathered. In block 404, business rules based on the priorities of the respective available lots are applied. In block 406, the resulting dispatch list of what lot(s) to work on next is provided to the FCS 106.

Figure 5:
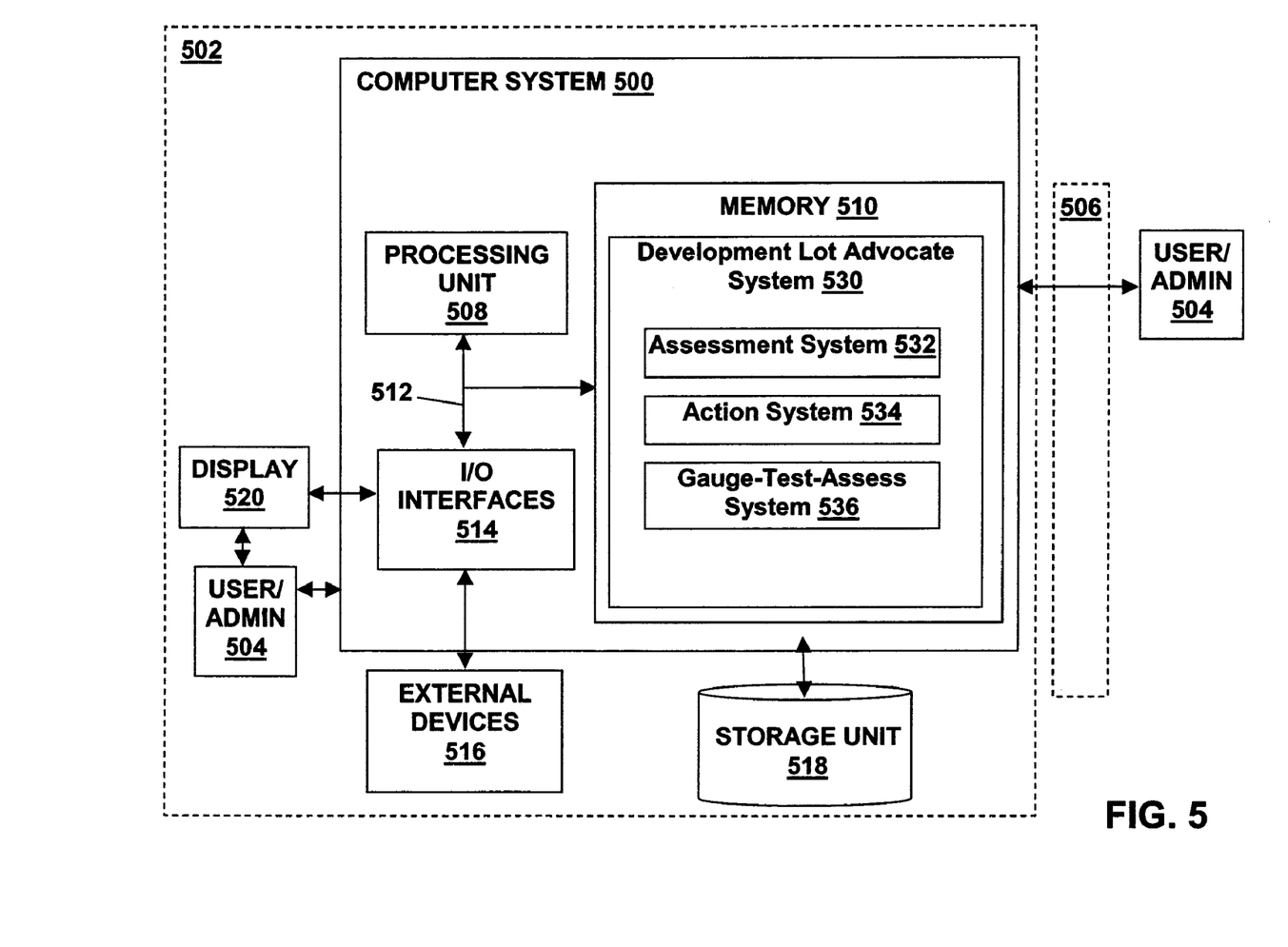
FIG. 5 depicts an illustrative computer system for implementing a method in accordance with an embodiment of the present invention The drawings are merely schematic representations, not intended to portray specific parameters of the invention. The drawings are intended to depict only typical embodiments of the invention, and therefore should not be considered as limiting the scope of the invention. In the drawings, like numbering represents like elements.

A computer system 500 for providing improved flow of development lots in a manufacturing facility in accordance with an embodiment of the present invention is depicted in FIG. 5. Computer system 500 is provided in a computer infrastructure 502. Computer system 500 is intended to represent any type of computer system capable of carrying out the teachings of the present invention. For example, computer system 500 can be a laptop computer, a desktop computer, a workstation, a handheld device, a server, a cluster of computers, etc. In addition, as will be further described below, computer system 500 can be deployed and/or operated by a service provider that provides improved flow of development lots in a manufacturing facility, as described above in accordance with the present invention. It should be appreciated that a user/administrator 504 can access computer system 500 directly, or can operate a computer system that communicates with computer system 500 over a network 506 (e.g., the Internet, a wide area network (WAN), a local area network (LAN), a virtual private network (VPN), etc). In the case of the latter, communications between computer system 500 and a user-operated computer system can occur via any combination of various types of communications links. For example, the communication links can comprise addressable connections that may utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 500 is shown including a processing unit 508, a memory 510, a bus 512, and input/output (I/O) interfaces 514. Further, computer system 500 is shown in communication with external devices/resources 516 and one or more storage unit(s) 518. In general, processing unit 508 executes computer program code, such as development lot advocate system 530, that is stored in memory 510 and/or storage system(s) 518. While executing computer program code, processing unit 508 can read and/or write data, to/from memory 510, storage system(s) 518, and/or I/O interfaces 514. Bus 512 provides a communication link between each of the components in computer system 500. External devices/resources 516 can comprise any devices (e.g., keyboard, pointing device, display (e.g., display 520, printer, etc.) that enable a user to interact with computer system 500 and/or any devices (e.g., network card, modem, etc.) that enable computer system 500 to communicate with one or more other computing devices.

Computer infrastructure 502 is only illustrative of various types of computer infrastructures that can be used to implement the present invention. For example, in one embodiment, computer infrastructure 502 can comprise two or more computing devices (e.g., a server cluster) that communicate over a network (e.g., network 506) to perform the various process steps of the invention. Moreover, computer system 500 is only representative of the many types of computer systems that can be used in the practice of the present invention, each of which can include numerous combinations of hardware/software. For example, processing unit 508 may comprise a single processing unit, or can be distributed across one or more processing units in one or more locations, e.g., on a client and server. Similarly, memory 510 and/or storage system 516 can comprise any combination of various types of data storage and/or transmission media that reside at one or more physical locations. Further, I/O interfaces 514 can comprise any system for exchanging information with one or more external devices/resources 516. Still further, it is understood that one or more additional components (e.g., system software, math co-processor, cache memory, etc.) not shown in FIG. 5 can be included in computer system 500. However, if computer system 500 comprises a handheld device or the like, it is understood that one or more external devices/resources 516 (e.g., a display) and/or one or more storage unit(s) 518 can be contained within computer system 500, and not externally as shown.

Storage system(s) 518 can be any type of system (e.g., a database) capable of providing storage for information under the present invention. Such information can include, for example, rules, targets and parameter 108 (FIG. 1), suggested adjustments and/or recovery actions 110 (FIG. 1), development lot progress information provided by the floor control system 106 (FIG. 1), etc. To this extent, storage system(s) 518 can include one or more storage devices, such as a magnetic disk drive or an optical disk drive. In another embodiment, storage system(s) 518 can include data distributed across, for example, a local area network (LAN), wide area network (WAN) or a storage area network (SAN) (not shown). Although not shown, additional components, such as cache memory, communication systems, system software, etc., may be incorporated into computer system 500. Moreover, although not shown, computer systems operated by user/administrator 504 can contain computerized components similar to those described above with regard to computer system 500.

Shown in memory 510 (e.g., as a computer program product) is a development lot advocate system 530 provided in accordance with an embodiment of the present invention. In general, the development lot advocate system 530 includes an assessment system 532 for comparing the progress of development lots on a manufacturing facility against business targets, based on status information provided by a floor control system (e.g., FCS 106, FIG. 3). If a set (i.e., one or more) of development lots is determined by the assessment system 532 to be behind or ahead of schedule, an action system 534 generates/establishes a set (i.e., one or more) of suggested adjustment and/or recovery actions. The set of suggested adjustment and/or recovery actions generated by the action system 534 is provided to a gauge, test and assess (GTA) system 536, which accesses the impact of the suggested adjustment and/or recovery actions on the manufacturing facility. If the suggested adjustment and/or recovery actions result in an appropriate adjustment/recovery, then, as appropriate, control guidelines on how to assign development or production lots to tools are sent to associated local control agents.

The present invention can be offered as a business method on a subscription or fee basis. For example, one or more components of the present invention can be created, maintained, supported, and/or deployed by a service provider that offers the functions described herein for customers. That is, a service provider can be used to provide improved flow of development lots in a manufacturing facility, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for controlling the flow of production lots and development lots in a manufacturing facility, comprising:
    establishing at least one target for processing of a set of development lots in the manufacturing facility;
    monitoring a progress of the set of development lots in the manufacturing facility;
    comparing the progress of the set of development lots against the at least one target;
    establishing at least one suggested action for the set of development lots if the progress of the set of development lots deviates from the at least one target; and
    deciding which development lots in the set of development lots to assign to at least one tool in the manufacturing facility, wherein the at least one suggested action is incorporated into the assignment decision.

2. The method of claim 1, wherein the at least one suggested action includes at least one of an adjustment action and a recovery action.

3. The method of claim 1, wherein the at least one target comprises a business target.

4. The method of claim 1, wherein the step of comparing the progress further comprises:

comparing the progress of the set of development lots against the at least one target according to a set of rules, targets, and parameters.

5. The method of claim 4, further comprising:
establishing the set of development lots;
establishing the set of rules, targets, and parameters for the set of development lots; and
modifying the set of rules, targets, and parameters in response to a change in the at least one target.

6. The method of claim 1, wherein the at least one suggested action influences, but does not dictate, the assignment decision.

7. The method of claim 1, wherein the step of deciding which development lots in the set of development lots to assign to at least one tool in the manufacturing facility further comprises:
assessing an impact of the at least one suggested action to determine if the at least one suggested action will result in an appropriate response.

8. The method of claim 7, further comprising:
establishing at least one new suggested action for the set of development lots if it is determined in the assessment step that the at least one suggested action will not result in an appropriate response.

9. The method of claim 7, further comprising:
providing control guidelines on how to assign the set of development lots to the at least one tool if it is determined in the assessment step that the at least one suggested action will result in an appropriate response.

10. A system for controlling the flow of production lots and development lots in a manufacturing facility, comprising:
means for establishing at least one target for processing of a set of development lots in the manufacturing facility;
means for monitoring a progress of the set of development lots in the manufacturing facility;
means for comparing the progress of the set of development lots against the at least one target;
means for establishing at least one suggested action for the set of development lots if the progress of the set of development lots deviates from the at least one target; and
means for deciding which development lots in the set of development lots to assign to at least one tool in the manufacturing facility, wherein the at least one suggested action is incorporated into the assignment decision.

11. The system of claim 10, wherein the at least one suggested action includes at least one of an adjustment action and a recovery action.

12. The system of claim 10, wherein the at least one target comprises a business target.

13. The system of claim 10, wherein the means for comparing compares the progress of the set of development lots against the at least one target according to a set of rules, targets, and parameters.

14. The system of claim 13, further comprising:
means for establishing the set of development lots;
means for establishing the set of rules, targets, and parameters for the set of development lots; and
means for modifying the set of rules, targets, and parameters in response to a change in the at least one target.

15. The system of claim 10, wherein the at least one suggested action influences, but does not dictate, the assignment decision.

16. The system of claim 10, wherein the means for deciding which development lots in the set of development lots to assign to at least one tool in the manufacturing facility further comprises:
means for assessing an impact of the at least one suggested action to determine if the at least one suggested action will result in an appropriate response.

17. The system of claim 16, further comprising:
means for establishing at least one new suggested action for the set of development lots if the means for assessing determines that the at least one suggested action will not result in an appropriate response.

18. The system of claim 17, further comprising:
means for providing control guidelines on how to assign the set of development lots to the at least one tool if the means for assessing determines that the at least one suggested action will result in an appropriate response.

19. A program product stored on a computer readable medium for controlling the flow of production lots and development lots in a manufacturing facility, the computer readable medium comprising program code for performing the following steps:
establishing at least one target for processing of a set of development lots in the manufacturing facility;
monitoring a progress of the set of development lots in the manufacturing facility;
comparing the progress of the set of development lots against the at least one target;
establishing at least one suggested action for the set of development lots if the progress of the set of development lots deviates from the at least one target; and
deciding which development lots in the set of development lots to assign to at least one tool in the manufacturing facility, wherein the at least one suggested action is incorporated into the assignment decision.

20. The program product of claim 19, wherein the at least one suggested action includes at least one of an adjustment action and a recovery action.

* * * * *